Sept. 15, 1970  MASATO. KAMIMURA ET AL  3,528,325
HELICAL CUTTER
Filed Nov. 28, 1967  2 Sheets-Sheet 1
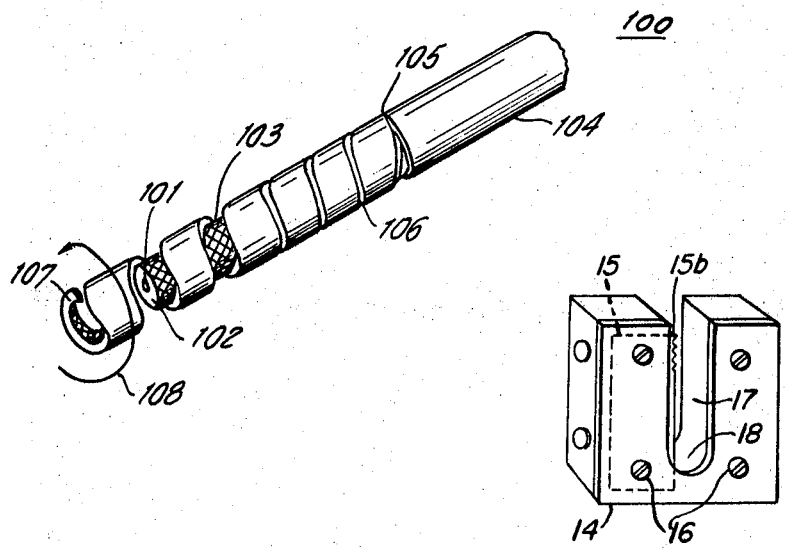
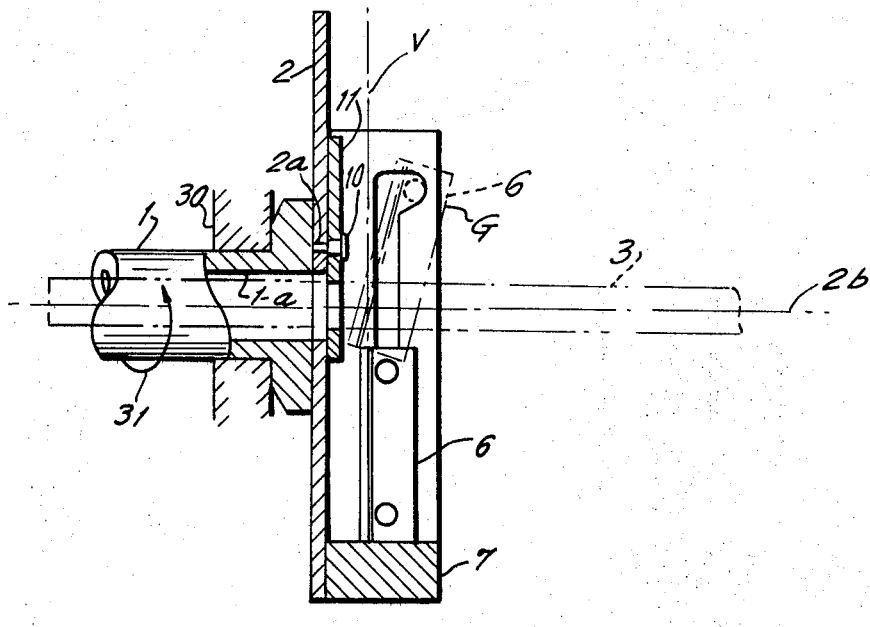
INVENTORS
MASATO KAMIMURA
SABURO FUKUI
BY
OSTROLENK, FABER, GERB & SOFFEN
ATTORNEYS

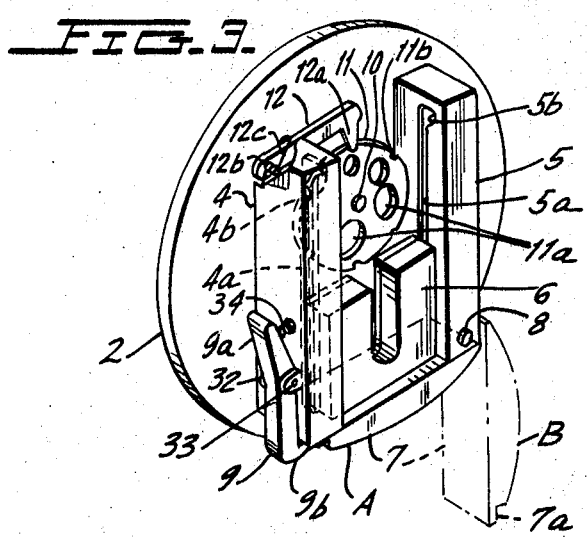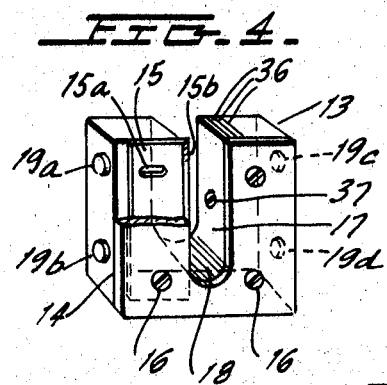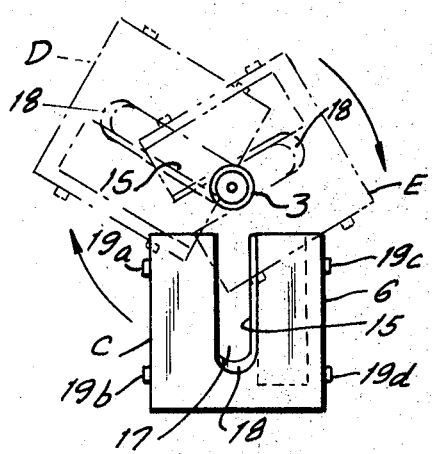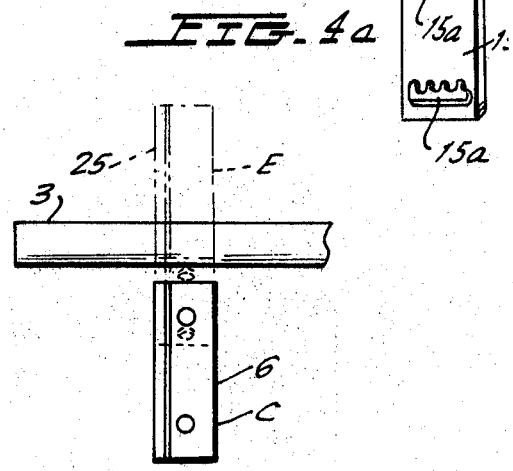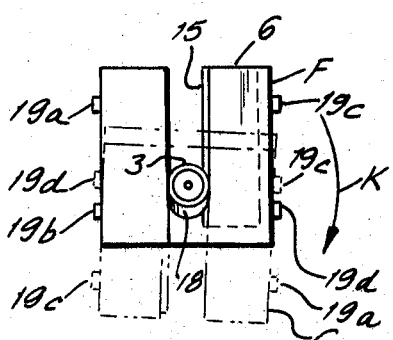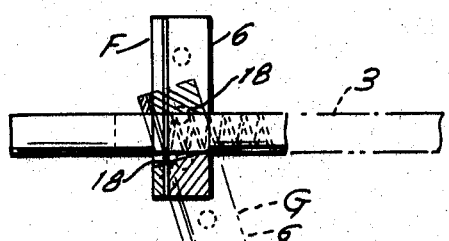

United States Patent Office 3,528,325
Patented Sept. 15, 1970

3,528,325
HELICAL CUTTER
Masato Kamimura and Saburo Fukui, Tokyo, Japan, assignors to Nippon Electric Company Limited, Tokyo, Japan
Filed Nov. 28, 1967, Ser. No. 686,046
Claims priority, application Japan, Nov. 29, 1966, 41/78,543
Int. Cl. H02g 1/12
U.S. Cl. 81—9.5    11 Claims

ABSTRACT OF THE DISCLOSURE

A tool adapted for either hand operation or substantially fully automatic operation for removing a layer or coating of insulation material surrounding a cable or other similar structure with a slot or opening for receiving the member to be stripped, and is provided with a cutting blade for stripping the sleeve or outer cover to a predetermined depth. The tool and cable are rotated relative to one another to form a substantially annular cut until the cable is brought into surface contact with the diagonally aligned base of the opening, causing the blade to be aligned diagonally relative to the cable. Relative rotation is continued with the tilting of the cable and tool causing the blade to form a helical cut. The blade and tool move toward one end of the cable during the helical cutting operation until it becomes separated from the end of the cable. The portion of the sheathing to be removed is then simply stripped or unwound without the need for any significant pulling or removing force, as is required with conventional stripping devices.

---

The present invention relates to cable assemblies, and the like, and more particularly to a novel cutter for stripping or removing the outermost sheath or sleeve from a cable or other like member having a substantially circular cross-sectional profile in which the tool, under either manual or automatic operation, forms a substantially annular cut a spaced distance in from one end of the cable and then forms a helical cut extending from the annular cut toward the said one end of the cable to facilitate removal of the stripped portion simply by unwinding from the cable, thereby completely avoiding the need for exerting any significant pulling or other form of force in the removal operation of the sleeves.

It is useful in a wide variety of applications, the simplest and most prevalent application being that of stripping the outer covering or sleeve of a communication cable (for example) including coaxial cables and cords having an insulating sheath and commonly employed in electrical power systems, power supply systems of electrical equipment, power distribution networks, and the like.

Conductors, leads, coaxial cables, and the like, are normally provided for use in any and all electrical and electronic circuits and power networks. Such cables or wires are normally provided with an outer covering or sleeve of a suitable insulating material which extends the entire length of the cable or wire so as to completely surround the internal conductor. Such cables or wires are conventionally used to interconnect electrical components of assemblies or systems, or in the alternative, are employed to connect power sources to electrical systems. Before connections can be made, it is necessary to cut the cable or wire to the desired length and then remove or strip a portion of the outer sleeve a spaced distance inward from each end of the cable in order to get the desired electrical and mechanical connection between the cable and the two electrical components, systems, power sources and the like which are to be interconnected. The stripping operation is conventionally formed through the use of a stripper or like mechanical device which forms an annular slit around the periphery of the covering to be stripped, said slit being made a predetermined spaced distance inward from each end of the cable. The removal operation is performed by rigidly clamping the wire and pulling one end preferably in a linear direction while the stripper embraces the portion of the sleeve to be cut away at the annular cut. This stripping operation has been found to be effective for fine (i.e., relatively thin) single-core covered wires, and the like. However, in the case of coaxial cables, or in the case of cables of substantial thickness having a substantially thick insulating sleeve, the use of conventional stripping devices necessitates the use of a substantially large pulling force applied to the wire to withdraw it from the portion of the insulating sleeve to be removed, thereby exposing the inner conductor or other structure such as a metallic sheath of the cable to damage during the pulling operation.

In stripping operations upon wires having substantially large diameters or in operations in which the length of the stripped portion is substantially large, the conventional stripping devices have been found to be quite impractical. The impracticality of such conventional devices has also been found to exist in applications wherein the synthetic resin or similar insulation material surrounding the cable has been found to permeate the braided shield or woven fabric tape or similar laminated section of a wire or cable assembly which lies immediately beneath and adjacent the outer insulating sleeve.

The present invention is characterized by providing a novel annular-helical cutter which is capable of solving all of the problems experienced through the use of conventional cutters and thereby results in a striking improvement in operation efficiency, while at the same time achieving a clean, high quality stripped portion for each and every cable, regardless of the thickness of the cable and/or the thickness of the insulating sheath.

The present invention is comprised of a substantially solid rectangular-shaped member having an elongated slot for receiving the cable. A cutting blade is secured to one face and is aligned so that the cutting edge extends across a portion of the slot. The slot has a diagonally aligned base.

The cutting operation is performed by inserting the cable into the slot and rotating the solid member relative to the cable, causing the blade to form an annular-shaped cut in the periphery of the insulating sleeve. During rotation, the cable is urged toward the base of the slot until its circular periphery is urged into contact with the diagonally aligned base of the slot. With the relative rotation between cable and solid member being maintained, pressing of the circular periphery of the cable against the floor of the slot causes the solid member and cutting blade to be diagonally tilted relative to the longitudinal axis of the cable, causing the blade to move along a helical path and thereby forming a helical cut extending from the annular cut to the end of the cable at which point the solid member is automatically separated from the cable. The stripping operation is completed simply by unpeeling or removing the stripped portion in an "unwinding" fashion, thereby completely avoiding the need for exerting a pulling force on the cable and at the same time exerting a gripping force on the portion of the insulating sleeve to be removed.

Automatic operation is obtained by mounting the solid member between a pair of guiding members, each of which is provided with a track or groove for receiving projecting pins provided on opposite surfaces of the solid member. The guiding members are secured to a large plate having a central opening for receiving the cable. In the loading position, the large plate, which experiences rotation, has the cable threaded therethrough and is angularly aligned so that the solid member lies beneath the cable with the open end of the slot positioned immediately below the cable. The plate is then rotated, either clockwise or counterclockwise, causing the solid block to move above the cable until the force of gravity causes the block to move toward the cable guided by the grooves provided in the guide means so that the cable is caused to enter into the slot. As the rotation continues, the blade starts to cut into the insulating sleeve, causing a slit to be formed therein. The relative rotation between the solid block member and the cable causes the cable to enter deeper into the slot until its circular periphery makes surface contact with the base or floor of the slot. The slots in the guide members are further provided with enlarged portions at a first end thereof, enabling the solid block to be tilted under the control of the aligning force exerted between the cable and the floor of the slot so that the block becomes diagonally aligned relative to the longitudinal axis of the cable. The diagonal orientation of the solid block, together with the relative rotation between block and cable, causes the cutting blade to form a helical slit or cut in the outer sleeve an simultaneously therewith to move the cable out of the slot until the end of the cable closest to the slot is completely delivered from the cutting edge of the blade. After the annular and helical-shaped cuts and delivery of the cable from the solid block is completed, the stripping operation is quickly and simply completely by removing the cut-away portion of the sleeve in an "unwinding" fashion.

Although either the cable or the plate upon which the guide members and solid block are mounted may be rotated while the other is restrained from rotation, in one preferred embodiment rotation may be imparted to the plate by providing the plate with a hollow, cylindrical member secured to one surface thereof and coupled to a suitable motor drive means. The cable is simply inserted through the hollow, cylindrical member so as to extend through the member and the plate and project a predetermined distance beyond the cutting edge of the blade member provided on the solid block.

A second plate may be mounted upon the rotatable plate and provided with a plurality of openings, each of which is positionable so as to be concentric with the opening in the first plate for receiving and aligning cables of varying diameter. The depth of the cut to be made in the insulating sheath may be readily controlled by providing the blade mounting with adjustable means for moving the blade edge relative to the solid block so as to cover greater or lesser portion of the slot. Frictional drag between blade and cable may be enhanced by providing the blade with a sawtooth or serrated cutting edge, if desired.

It is, therefore, one primary object of the instant invention to provide a novel cutting tool useful either manually or in automatic opertions for the purpose of stripping insulating sleeves from a cable or cord assembly.

Another object of the present invention is to provide a novel tool useful either manually or in an automatic operation for stripping insulating sleeves from cables, and the like, by initially forming an annular-shaped cut in the insulating sleeve of a cable, to be immediately followed by a helical-shaped cut extending from the annular-shaped cut, preferably toward the end of the cable closest to the annular cut.

Still another object of the present invention is to provide means for stripping the insulating sheath from cables, and the like, comprising a solid slotted block for receiving the cable having a blade member positioned with its cutting edge extending in toward the slot for cutting an annular groove in the periphery of the cable insulating sleeve by inserting the cable into the slot and rotating the cable and the block relative to one another.

Yet another object of the present invention is to provide means for stripping the insulating sheath from cables, and the like, comprising a solid slotted block for receiving the cable having a blade member positioned with its cutting edge extending in toward the slot for cutting an annular groove in the periphery of the cable insulating sleeve by inserting the cable into the slot and rotating the cable and the block relative to one another, and wherein the base or floor of the slot is aligned diagonally relative to the longitudinal axis of the cable to cause the cutting edge of the blade to form a helical cut extending from the annular-shaped cut toward one end of the cable due to the relative rotation between cable and block which forces the diagonal alignment of the elements, hence causing the helical-shaped cut.

Still another object of the present invention is to provide novel means for stripping insulating sheaths from cables, and the like, comprising slotted means having a blade extending inwardly toward the slot for receiving the cable to be stripped, rotatable guide means reciprocally mounting the slotted means for receiving the cable to be stripped and for rotating the slotted means into cutting engagement with the cable, causing the cutting edge of the blade to first form an annular-shaped cut and then to form a helical-shaped cut in the insulating sleeve, and simultaneously therewith to move the cable in the longitudinal direction and completely deliver the cable from the cutting means.

A still further object of the instant invention is to provide means for stripping insulating sheaths from cables, and the like, comprising slotted means having a blade extending inwardly toward the slot for receiving the cable to be stripped, rotatable guide means reciprocally mounting the slotted means for receiving the cable to be stripped and for rotating the slotted means into cutting engagement with the cable, causing the cutting edge of the blade to first form an annular-shaped cut and then to form a helical-shaped cut in the insulating sleeve, and simultaneously therewith to move the cable in the longitudinal direction and completely deliver the cable from the cutting means, and wherein adjustable means are provided for receiving and aligning cables of predetermined diameters so as to maintain the cables in the proper cutting position relative to the cutting means.

These as well as other objects of the present invention will become apparent when reading the accompanying description and drawings in which:

FIG. 1 is a perspective view of a section of coaxial cable which has been precut in an annular and helical manner by the device of the present invention.

FIG. 2 is a side elevational view partially sectionalized to show the essential components of one preferred embodiment of the present invention for slitting cables in the manner shown in FIG. 1.

FIG. 3 is a perspective view showing the rotatable disk assembly portion of the embodiment of FIG. 2.

FIG. 4 is a perspective view showing the slitter cartridge which forms part of the assembly of FIGS. 2 and 3.

FIG. 4a is a perspective view of another blade useful in the cartridge of FIG. 4.

FIG. 4b is a perspective view showing another slitter cartridge assembly.

FIGS. 5a and 5c are front views of the slitter cartridge and cable useful in explaining the stripping operation.

FIGS. 5b and 5d are end views of the slitter cartridge and cable shown in FIGS. 5a and 5c, respectively.

FIG. 1 shows a coaxial cable 100 having a central conductor 101, an inner insulating layer or sleeve 102, a conductive sleeve 103 which is shown as being a braided metallic sheath; and an outer sleeve 106.

The stripping operation of the cable, as will be made obvious from the ensuing description, is comprised of the steps of forming an annular-shaped slit or cut 105 a spaced distance in from one end of the coaxial cable (in this case, the left-hand end of the cable shown in FIG. 1) to be immediately followed by the formation of a helical-shaped cut 106 extending from the annular-shaped cut 105 to the left-hand end of the cable. The stripped portion is then easily or readily removed, preferably in an "unwinding" fashion simply by gripping the cut portion near the end thereof such as, for example, at the point 107 and "unwinding" the cut portion tracing a circular or helical path, as indicated by the arrow 108. The stripping operation completely avoids the need for applying a large external pulling force required in conventional stripping operations, and likewise completely avoids inflicting of possible damage to the laminated or braided portion 103 underlying the outer sheath. Both the cutting and removing operations described above can be performed with extreme ease.

The construction and operation of one preferred embodiment of the present invention capable of stripping cables and the like of the type shown in FIG. 1, for example, will now be described with reference to FIG. 2, which embodiment is comprised of a mandrel 1 journalled within a support bracket 30 to enable free rotation of the mandrel preferably in the direction shown by arrow 31, relative to support 31. The right-hand end of mandrel 1 has secured thereto a rotatable disk 2. The openings in disk 2 and mandrel 1 are aligned to define an axial cavity 1a for receiving a covered cord or cable 3, shown in phantom line fashion. Whereas the cable may be a coaxial cable of the type shown having an outer insulating sleeve or sheath, the stripping operation is not limited to coaxial cables.

Any suitable motor means (not shown) may be coupled to mandrel 1 by means of a pulley or any other suitable power coupling means (not shown). The mandrel is positioned and supported for rotation by means of the frame or support plate 30 into which the mandrel 1 is journalled. The rotation of mandrel 1 simultaneously causes rotation of disk 2 therewith.

The rotary disk assembly is best shown in FIGS. 2 and 3, and is comprised of a pair of mutually parallel guide frames 4 and 5, each having a guide groove 4a and 5a likewise arranged in parallel fashion and being of a predetermined depth. A slitter cartridge 6, which is preferably a solid substantially rectangular-shaped block is slidably fitted in the guide grooves 4a and 5a so as to experience free sliding movement therein.

The grooves 4a and 5a extend to the very bottom of guide frames 4 and 5 to permit removal and replacement of the slitter cartridge 6. The slitter cartridge is retained within the guide frames by means of a pivotally mounted lid rotatable about the axis of a fulcrum screw 8 secured at one end thereof to guide frame 5 and lid 7. The opposite end of lid 7 is provided with a shoulder or notch 7a for cooperation with a lid holding lever 9 which is secured to guide frame 4 by means of a mounting bracket 32 which receives and retains the ends of a pin member 33 which passes through a suitable opening (not shown) in lid holder 9. The lower end of lid holder 9 projects at right angles to the main body of the holder so as to overlie shoulder 7a in lid 7. The lid holder is normally biased in the clamping position by means of a biasing spring 34 secured at its opposite ends within suitable openings in frame 5 and the handle portion 9a of lid holder 9. The cartridge may be removed simply by depressing the handle portion 9a of lid holder 9, causing it to move toward the confronting surface of guide frame 4, thereby lifting its clamping portion 9b out of engagement with the shoulder 7a provided in lid holder 9. This allows the lid holder 9 to move from its solid line position to the dotted line position, enabling the slitter cartridge to be dropped out of frame 5 for replacement, adjustment, inspection, and the like.

The slitter cartridge 6 may be replaced and maintained in the position shown in FIG. 3 simply by lifting the lid 7 from the dotted line to the solid line position. The lid holder 9 should be held with its handle 9a in the depressed position to enable the holder 9 to clear the lower portion 9b thereof at which time the lid holder may then be released, causing the shoulder 7a to be clamped thereby.

Grooves 4a and 4b in guide frames 4 and 5, respectively, are further provided with enlarged portions 4b and 5b, respectively, to enable the slitter cartridge 6 to move to an inclined position in one stage of the cutting operation in a manner to be more fully described.

The rotary disk 2 has pivotally mounted thereon a guide disk 11 having a suitable opening (not shown) for receiving axial pin 10 which is further received by and secured to rotatable disk 2 at 2a.

The guide disk 11 is provided with guide apertures 11a of graduated diameters for receiving and guiding cables having a variety of outer diameters to facilitate the cutting operation. The guide disk may be rotated about axial pin 10 to move any one of its guide apertures 11a over the axial cavity 1a so as to be concentric therewith, for the purpose of receiving and guiding therethrough a cable having an outer diameter just slightly less than the diameter of the guide aperture 11a positioned in alignment with axial cavity 1a in order to maintain the covered cable to be stripped in alignment with the longitudinal axis 2b of rotary disk 2. Guide disk 11 may be maintained with any one of its guide apertures 11a positioned in alignment with guide cavity 1a by means of a detent 12 having a tapered projection 12a which may be moved into any one of the notches 11b provided around the periphery of guide disk 11. The detent 12 is pivotally mounted at its left end, as shown in FIG. 3, by a pivot pin 12b. Spring means 12c normally urges tapered portion 12a of detent 12 toward the periphery of guide disk 11. Rotation of the guide disk 11 may be performed simply by lifting the detent tapered portion 12a out of the notches and away from the periphery of the guide disk 11. When the appropriate guide aperture is positioned in alignment with axial cavity 1a, detent 12 may be released so as to lodge itself into one of the associated notches 11b under the biasing force of spring 12c.

FIG. 4 shows a detailed perspective view of the slitter cartridge 6 which is provided with a lead groove or slot 17 having a width preferably slightly greater than the outer diameter of the insulating sheath to be stripped. A substantially U-shaped holder plate 14 is secured to one face of slitter cartridge 6, and is held in position by fastening members 16. The slot in holder plate 14 is preferably of the same dimension as the slot 17 in cartridge 6. A blade member 15 is positioned between the holder plate 14 and the confronting face of cartridge 6, and is provided with suitable openings 15a (only one of which is shown) for receiving a pair of the fastenings members 16. The blade is positioned so that its cutting edge 15b extends into the slot or groove 17 so that the distance between cutting edge and the opposite surface of the slot 17 corresponds to the depth of the cut to be formed in the insulating sleeve provided on the cable.

The bottom or base or slot 17 is sloped or inclined, as indicated at 18 (note also FIGS. 5a, 5c and 5d), to facilitate the formation of the helical cut in a manner to be more fully described. The guide pins 19a–19b and 19c–19d are secured in suitable openings provided in the slitter cartridge block 6 and project outwardly by an amount sufficient to be received by the guide grooves 4b and 5b, respectively, in the manner best shown in FIG. 3. The guide pins are preferably of a length insufficient to make frictional engagement with the floors of guide grooves 4b and 5b so as to enable the slitter cartridge to be freely slidable within the grooves.

In the preferred embodiment of the present invention, the structure of the slitter cartridge may be modified in various ways (not shown) without impairing its successful operation. One example of such modification includes the provision of a lead slot 17 which is freely adjustable in width to accommodate covered cords of varying outer diameter. This may be brought about by providing a plurality of sections 36 secured to the main body of the guide block by fastening means 37. Removal of any one of these sections, or all of them, provides a slot 17 of increasing width. In a contrary fashion, insertion of one or more of the sections 36 provides a slot of diminishing width to accommodate cables of varying outer diameters.

As shown in FIG. 4, the openings 15a (only one of which is shown) for receiving a pair of the fastening members 16 may be elongated slots for adjustably positioning the blade edge 15b at varying distances from the opposite edge of the slot 17. As another alternative, each blade may be provided with a pair of circular openings positioned at differing distances from the blade edge. Each time a cable of a differing diameter is to be stripped, the slitter cartridge may be removed from the assembly shown in FIG. 3 and the appropriate blade may be mounted thereto.

As still a further alternative, each blade 15, as shown in FIG. 4a, may be provided with a pair of elongated slots 15a, each having a plurality of annular-shaped slots 15c extending along one edge thereof. An associated pair of such annular-shaped openings may then be positioned to receive one of the fastening members 16 and thereby adjustably position the blade cutting edge relative to the far side of the slitter cartridge slot 17.

The blade 15 may take many different forms other than the razor-like form shown in FIGS. 4 and 4a. For example, the blade 15 may be provided with a sawtooth or serrated cutting edge as shown in FIG. 4b for the purpose of increasing the intensity of biting engagement between the blade and the insulating sheath. Such a serrated cutting edge has been found quite advantageous for use with coverings having a large radial thickness and for cables having large outer diameters. Obviously, any other cutting edge configuration may be employed commensurate with the particular material which is employed in the cable covering.

Reference will now be made to FIGS. 2, 3 and 5a through 5d for the purpose of describing the operation and most important functions of the present invention, including the cable cover slitting action of the slitter cartridge and the function of discharging the covered cord from the slitter cartridge while forming a helical slit in the cable insulating sleeve.

The coaxial cable or other type cable or wire having an insulating sheath is inserted through the left-hand end of mandrel 1 and the opening in rotatable disc 2 until its right-hand end extends a predetermined distance beyond a vertical line V with the distance between vertical line V and the right-hand end of cable 3 being determinative of the amount of the insulating sleeve to be stripped from the cable. Actually, preparatory to the insertion of the cable the rotary disc 2 should be positioned so that the slitter cartridge occupies the position shown in FIG. 3 wherein the open end of the slot in cartridge 6 is positioned beneath the cable 3. As a further preparatory measure, the guide disc 11 is rotated and duly locked into position by detent 12 so as to confront axial cavity 1a with an opening which is preferably just slightly greater than the outer diameter of the cable. The cable 3 with the insulating sleeve is held against rotation by any suitable means (not shown).

As shown in FIG. 5a the slitter cartridge is initially in the solid line location C before rotation of the mandrel 1 and disc 2 is initiated. Rotation in the clockwise direction relative to FIGS. 5a and 5c is imparted to mandrel 1 and hence to disc 2 causing the guide frames 4 and 5, and hence the slitter cartridge 6 to move to the phantom line position D. As soon as the position D is reached the slitter cartridge 6 is caused to slide by gravity along the guide grooves 4a and 5a in a direction so as to cause the open end of the slot 17 to approach the sheathed cable 3 until the cartridge 6 assumes the position D at which time the cutting edge of blade 5 comes into contact with the periphery of the cord or cable 3.

As rotation is continued in the clockwise direction (relative to FIGS. 3, 5a and 5c) the cutting edge of blade 15 begins to cut into the insulating sleeve covering the cable and forms a slit therein in a progressive fashion as the cartridge slides radially inward relative to the rotatable disc 2, such as, for example, the position E where it can be seen that the cartridge 6 has experienced both rotational movement from the orientation of position D, as well as linear movement wherein it moves inwardly along a radial line of disc 2, in effect causing the cable 3 to move deeper and deeper into slot 17. This slitting operation will be referred to hereinafter simply as "slitting."

The principle of the slitting operation is as follows:

As the slitter cartridge 6 rotates in unison with rotatable disc 2 about the longitudinal axis of covered cords or cable 3 while the cord or cable is restrained from rotation, the surface of the cable now positioned within the slot 17 comes into surface contact with the side wall opposite the blade cutting edge, as well as the blade cutting edge itself. In this position, the cable cover is subjected to a frictional drag imposed upon it by the side wall of the slot 17 opposite the blade cutting edge and at the same time is subjected to the resistance of the blade edge as it is forced to cut into the cord covering. Under these conditions the frictional drag of the side wall of the slot opposite the blade cutting edge is smaller than the resistance of blade 15 and the cable 3 is thus subjected to an unbalanced resultant resistance which causes the cable to slip over the one side wall of the lead groove 17 while the blade edge cuts into the periphery of the cable. As a result, the cable which conversely can be considered as rotating in the counterclockwise direction relative to cartridge 6, is caused to move deeper and deeper into the slot until it reaches the face or floor 18 of the slot, rolling on the blade cutting edge and thereby forming an annular slit 105, as shown best in FIG. 1.

By the time the cable 3 reaches the bottom of slot 17 it is completed slitted about its periphery. At this time the slitter cartridge 6 reaches the solid line position F, shown in FIG. 5c. As rotation continues in the clockwise direction, as shown by arrow K in FIGS. 5a and 5c, the cutting edge of the blade 15 tends to continue its slitting action and thereby causes the slitter cartridge 6, which has previously been slitting the covered cable 3 at right angles to its longitudinal axis 2b, is caused to move to an inclined position as shown by the dotted line position G of FIG. 5d, as a result of the force imparted upon slitter cartridge 6 by the cable surface as the cable tends to urge itself against the sloping surface 18 provided at the base of the cartridge slot 17. At this time the guide pins 19a and 19c are permitted to enter into the widened portions 4b and 5b of the guide grooves 4a and 5a, respectively, enabling the slitter cartridge 6 to readily and easily move to the inclined position relative to the cable 3 as is indicated by the dotted line position G shown in either FIGS. 5d or 2. This motion will hereinafter be referred to as "sloping."

The slitter cartridge 6, in its inclined position G, continues rotation causing the cutting edge of the blade 15 to cut into the insulating sleeve of cable 3 in a manner such as to automatically discharge the cable (i.e. move it toward the left relative to FIG. 2) from slitter cartridge 6 while simultaneously forming a helical slit or cut in the cord covering. This operation will hereinafter be referred to as "helical slitting." The movement of the cable 3 toward the left continues until the helical slitting is completed and the cable is completely delivered or ejected from slitter cartridge 6. Once the annular cut 105 and the helical cut 106 have been formed in the periphery of cable 100 (see FIG. 1) the stripping operation can be easily and quickly completed by removing the helically cut portion through an "unwinding" operation in which the cutaway portion is unpeeled by moving it counterclockwise in preferably a helical manner as shown by the arrow 108 of FIG. 1.

It can be seen from the foregoing that the present invention provides a simple and yet positive way of removing insulating sleeves from cables in which the following features and advantages of the invention are obtained:

(1) Through the provision of a variety of cartridges having slots and/or adjustable blade members arranged corresponding to the outer diameter in thickness of the insulated coverings of covered cords, covered cables, and the like, the cutting mechanism of the present invention can be employed with extreme ease through a variety of different covered cords or the like by the selective use of cartridges employed on the rotating disc assembly shown best in FIGS. 2 and 3. The cutter assembly of this invention is highly advantageous particularly for use with sheathed cables which are thick, complicated in structure and which are not capable of being dealt with successfully in a simple and fast manner through the use of conventional stripping devices.

(2) The cutter assembly of the present invention is characterized by a simplicity of design making the device highly adaptable for mass production as well as being extremely easy to operate in the performance of the slitting, helical slitting and feeding functions which can be performed automatically through the simplified design mechanism described with respect to FIGS. 2 and 3.

(3) The employment of a slitter cartridge which automatically and easily cuts the periphery of a cable to the exact depth desired for stripping covered cables greatly enhances the reliability of the stripping operation and is highly advantageous for use in stripping covered cables of the type in which even the slightest damage or impairment to an underlying layer will prove to be irreparable. This is true since the cutter of the present invention can provide a helical slit of the desire ddepth which still nevertheless is not so deep as to completely penetrate the cord covering but is still sufficient to allow the covering to be stripped off with relative ease.

The material of the sheathed cable may be one selected from the group including polyethylene, vinyl chloride and other synthetic resins, as well as cords covered with rubber or other insulating materials or even in the case of metallic conductors covered with a lead layer can be processed with equal success using the invention described herein.

The invention disclosed herein in conjunction with one preferred embodiment, which is designed to strip covered cables and the like includes, as explained hereinbefore, an initial slitting operation comprised of forming an annular slit or cut about the periphery of the covered cable, followed by operations including the inclination of the slitter cartridge, helical slitting and feeding and discharging of the cable being stripped, all of which operations are affected sequentially in an automatic fashion. It should further be noted however that, in practice, the sequential operations of the present invention may be divided or separate as required and, for example, the slitting or helical cutting operations may be performed by a cutter structure particularly, designed to serve those purposes alone. In addition thereto, while the embodiment described herein is arranged to perform the operations by rotating the slitter cartridge while maintaining the covered cable against rotation, the same operation can also be affected with a cutter structure in which the slitter cartridge while positioned between guide frames 4 and 5 may nevertheless be restrained from rotating while the rotation is imparted to the cable to be stripped. Moreover, instead of employing the rotary disc assembly 2 in guide frames 4 and 5 in the embodiment shown in FIGS. 2 and 3 the slitter cartridge alone may be used as a hand-operated tool which will operate with equal success as compared to the automatic assembly. As one example, the cutting operation may be performed by placing a portion of the cable within a clamped bench vise while the slitter cartridge is forced on to the cable and simultaneously rotated therewith. In such an application, once the surface of the cable reaches the sloped portion of the slot 17, the slitter cartridge will be free to move to the inclined position in the hand of the operator, at which time rotation is continued until the slitter cartridge moves off one end of the cable while the cable is maintained in the stationary position in a bench vise or other similar clamping device.

Although the present invention has been described as being extremely useful for slitting covered cords, coaxial cables and the like, the application of the present invention is not limited to covered cords but can also be used to great advantage in forming a helical slit, for example, in tubes of synthetic resins. In such cases it should be recognized that the helical slitting action can be affected continuously with any desired helical lead irrespective of the axial length of the helical slit formation. Still further, it should be noted that the present invention is not limited to stripping an end portion of a cable but may be employed to strip an intermediate portion of a cable. This may be done in either one of two alternative methods. As a first method, the slitting, sloping and helical slitting operations may be performed in the same manner as was previously described. The helical splitting operation may then be terminated and the slitter cartridge withdrawn from its position embracing the cable. The cable may then be removed from the apparatus and the helically cut portion may then be stripped up to the desired point at which the helical slitting operation was terminated. The remaining cut may then be performed manually by a manually operated slitter cartridge or a knife or alternatively the cable may then be reinserted into the assembly in the reverse direction to perform only the slitting operation at that location along the cable at which the helical slitting operation was terminated. Thus it can be seen that any intermediate portion of a cable can be stripped as well as any end portion thereof.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A helical cutter comprising means for forming an annular slit of a desired depth in a rod-like article having a substantially circular cross-section profile, with the slit lying circumferentially along its periphery at any desired axial location and means for subsequently tilting the helical cutter relative to said article to form a helical slit of said desired depth in said rod-like article, which slit extends from said annular slit toward the adjacent end of the rod-like article helically in the general direction lengthwise thereof.

2. A device for stripping rod-shaped members comprising a solid member; a groove having an open end extending to one edge of said solid member being provided therein, said groove extending inwardly toward the opposite edge of said solid member, the width of said groove being larger than the outer diameter of the rod-shaped member being stripped; the base of said groove being inclined at an angle relative to the sides of said solid member which sides are substantially parallel to one another; a blade being secured to one of said sides of said solid member and having its cutting edge extended along one side of said groove inwardly toward the other side thereof so as to define the depth of the slit formed by said blade.

3. An outer cord section slitting device as set forth in claim 2 in which at least a portion of the edge of said blade which overlies one end of said groove is saw-toothed or serrated in shape.

4. A helical cutter including an outer cord section slitting device as set forth in claim 2 further comprising: means for holding said rod-shaped member having an outer cord covering section to be removed so as to expose a portion of the remaining inner cord section adjoining said cord covering section; means for rotating said slitting device relative to the rod-shaped member; means for slidably mounting said slitting device upon said rotating means to permit the slitting device to slide relative thereto in a direction transverse to the longitudinal axis of said rod-shaped member during an intial stage of such relative rotation and sliding movement wherein said slitter device is slidable substantially at right angles to the longitudinal direction of the cord; means for enabling the slitter device to become tilted, after the periphery of the rod-shaped member has come into contact with the sloped base of the groove formed in said slitting device thereby causing the latter to be slidable in a helical fashion with respect to the longitudinal axis of said rod-shaped member owing to the cooperative relationship of the sloped base of the groove and the now tilted cutting edge of the blade extending into the groove.

5. A method for continuously stripping cables and like conductors having an outer annular shaped insulating sheath of a predetermined thickness comprising the steps of:
   maintaining said cable stationary and forming an annular shaped slit around the periphery of said sheath to a depth almost equal to the thickness of said sheath;
   forming a helical shaped slit around the periphery of said sheath in a direction toward one of said ends and communicating with the annular shaped slit and terminating at said one of said ends.

6. The method of claim 5 further comprising the step of stripping away the cut portion by grasping a free end of the slit portion and peeling the slit portion away from the cable by an "unwinding" movement.

7. The device of claim 2 further comprising means for adjusting the position of the blade cutting edge relative to the groove provided in said solid member.

8. The device of claim 2 further comprising means in said solid member for adjusting the width of said groove.

9. The helical cutter of claim 4 wherein said rotatable member is a first plate having an opening for receiving the cable to be stripped; said opening being sufficient to receive cables of varying outer diameters extending over a predetermined range of distances; a guide plate pivotally mounted upon said first plate; said guide plate having a plurality of guide apertures of graduated diameters arranged around said plate and being selectively positionable to overlie the opening in said first plate to accommodate a plurality of cables of varying diameters lying within said predetermined range; detent means for said guide plate to lock any one of said guide apertures in an overlying position relative to said first plate opening.

10. The helical cutter of claim 4 further comprising a pair of spaced parallel guide frames secured to said rotating means; each of said frames having an elongated groove, said grooves being positioned on confronting faces of said frames; said solid member having a pair of projecting pins arranged on opposite parallel sides of said member to be slidably mounted within an associated one of said elongated grooves.

11. The device of claim 10 wherein said elongated grooves are each provided with widened groove portions at a first end of each elongated groove to enable said solid member to move to an inclined position when said rod-shaped member engages the sloping base portion of the groove provided in said solid member.

References Cited
UNITED STATES PATENTS

| | | | |
|---|---|---|---|
| 2,915,928 | 12/1959 | Felts et al. | 81—9.51 |
| 3,082,523 | 3/1963 | Modes et al. | 81—9.5 |

FOREIGN PATENTS

| | | |
|---|---|---|
| 828,171 | 2/1960 | Great Britain. |
| 921,760 | 3/1963 | Great Britain. |
| 976,132 | 11/1964 | Great Britain. |

ROBERT C. RIORDON, Primary Examiner

R. V. PARKER, Jr., Assistant Examiner